United States Patent
Johanson

(10) Patent No.: US 7,890,929 B1
(45) Date of Patent: Feb. 15, 2011

(54) METHODS AND SYSTEM FOR A TOOL AND INSTRUMENT ORIENTED SOFTWARE DESIGN

(75) Inventor: Kenneth Raymond Johanson, 26973 Rainbow Cir., Elizabeth, CO (US) 80107

(73) Assignee: Kenneth Raymond Johanson, Elizabeth, CO (US)

( * ) Notice: Subject to any disclaimer, the term of this patent is extended or adjusted under 35 U.S.C. 154(b) by 1197 days.

(21) Appl. No.: 11/459,890

(22) Filed: Jul. 25, 2006

(51) Int. Cl.
*G06F 9/44* (2006.01)

(52) U.S. Cl. .................. 717/114; 717/116; 717/119

(58) Field of Classification Search ............... None
See application file for complete search history.

(56) References Cited

U.S. PATENT DOCUMENTS

| | | | | |
|---|---|---|---|---|
| 5,920,718 | A * | 7/1999 | Uczekaj et al. | 717/109 |
| 5,995,753 | A * | 11/1999 | Walker | 717/108 |
| 6,272,672 | B1 * | 8/2001 | Conway | 717/107 |
| 6,668,203 | B1 * | 12/2003 | Cook et al. | 700/65 |
| 6,701,513 | B1 * | 3/2004 | Bailey | 717/109 |
| 7,089,256 | B2 * | 8/2006 | Smialek | 717/104 |
| 2003/0023951 | A1 * | 1/2003 | Rosenberg | 717/104 |
| 2004/0205708 | A1 * | 10/2004 | Kothari et al. | 717/113 |

OTHER PUBLICATIONS

"Matlab Toolboxes" <http://stommel.tamu.edu/~baum/toolboxes.html> as archived by the web archive project on Sep. 2003.*

* cited by examiner

*Primary Examiner*—Jason Mitchell

(57) ABSTRACT

A Toolbox and Instrument software design and runtime system which simulates real-world Tools by providing Instruments for the Tools' configuration, control, and state monitoring before, during, and after runtime. A Tool is a software function which may be used to modify an existing object or to create a new object. Tools with related functionality are grouped by their containment within appropriately named, static classes, or object references, their grouping which represents a Toolbox. Each Tool accepts one or more input (operand) objects to be changed or zero operands if a new object will be created, and each Tool also a Configuration Instrument, a State monitoring instrument, and optional Control Instrument. Alternatively, the Control and State Instrument's functionality can be consolidated into a single Instrument, or the Control and Configuration Instrument's functionality can be consolidated into a single Instrument.

20 Claims, No Drawings

METHODS AND SYSTEM FOR A TOOL AND INSTRUMENT ORIENTED SOFTWARE DESIGN

BACKGROUND OF THE INVENTION

1. Field of Invention

The present invention relates generally to software design patterns used in object oriented and procedural languages; More particularly, the present invention describes a method of building software components and systems using a new design pattern that reduces and simplifies the steps required to configure and dynamically control a software function in a multi-threaded environment, both at program implementation time and during software execution, and also to simplify monitoring by external processes of function's internal state, during runtime.

2. Background

Design patterns are recognized ways of repeatedly designing software to achieve predictable, and simplified designs. In software and other abstract reproductions of real world processes, there exists a desire to discover, design and use new design patterns which simplify designs by emulating real world Tools and processes. Such design patterns are ideally easy to learn & read, while also not sacrificing flexibility of the control-ability or monitor-ability of the process, both before and during execution. To achieve these goals, a software design pattern must very closely mimic distinct, real world processes and Tool designs.

However, current software design-patterns and prior art have thus far not described or implemented a single and consistent design pattern that is comprised of at least 4 distinct yet essential components: the subject to be acted upon (operand) or created, a Tool (function) to perform that action, a Configuration Instrument which can predefine the Tool's behavior before runtime, a Control Instrument which can control the Tool's behavior before and during runtime, and finally, a State Instrument that the Tool can use to allow external processes to monitor its internal states (such as for process regulation or human interface status reporting)

Current object-oriented design patterns for object factory or object mutating purposes typically require that a program writer must, in discrete steps: first call an object factory method or otherwise instantiate some Tool object, then call one or more of that single object's functions in some order to configure the Tool object, and finally call another function one or more times to start the function's execution phase, to create or modify an existing object. The order that these steps should be performed may cause confusion and so may yield an inconsistent behavior among Tools of related types. Additionally, the functions may have argument lists which are large and have input orders which further add a level of complexity and labor that must be performed by the programmer. Finally, the objects do not have methods which clearly isolate the control and state monitoring capabilities that real world Tools posses.

BRIEF SUMMARY OF THE INVENTION

The present invention relates to the desire to build software which encourages programmers to learn and consistently use a 'Tool' and 'Instrument' based design pattern, for controlling and monitoring software processes.

The enclosed invention describes combinations of specific software components and their organization, which when combined will provide novel software programming and runtime environments. The design is comprised of organized collections of tools ("Toolbox"), software functions ("Tools"), and state control and monitoring objects ("Instruments"), which together may be used to create or modify, simple or compound software objects, or references to those objects which may exists in some other location.

A compound object is any logical entity (such as class instances, structs, or arrays) which may contain one or more values or references to other objects. Type-specific examples of compound objects are as Numbers, Character Sequences, Arrays, and Database ResultSets, or references to remote objects such as HTTP URLs for example.

A Tool is a software function used to create compound objects, or to modify existing compound objects (operands). Related Tool's should be grouped together along with related tools, by placement inside of a class or object reference, which to the programmer will resemble a Toolbox. The programmer will recognize software modeling of Toolboxes, Tools and Control and Monitoring Instruments which will closely resemble real world Tools and their use-processes.

Toolboxes are containers for specialized Tools who's functionality, for efficiency reasons, is not normally built-in to the object for which they were designed. For example, there are hundreds of Bolts on an automobile, but a wrench is not built into each Bolt; instead a single or few wrenches exist externally and are used when needed, and are usable on many Bolts. Likewise, software objects also need to have minimal functionality built in to them, and need an abstract set of Tools to perform specialized operation upon them.

Where possible, multiple Tools with similar process-type or operand-type compatibility should be logically organized (grouped) into Toolboxes. A Toolbox is a container class or object reference who's name describes the organized purpose, or compatible object types, of it's contained Tools. When grouping inside of a compound object is not possible or efficient, Toolboxes will be instead represented by Tool (function) names who's prefix or suffix describes them and allows sorting and browsing the Toolbox.

As with real world Tools, the design allows independently operating threads, in addition to the calling thread, (processes) to use "Instruments" to monitor and change the behavior of the Tool before, during, and after it's execution. The programmer will pass the Instruments into each Tool's argument list at call time, then be able to use those Instruments to monitor and control the Tool.

An Instrument is a compound object which can contain one or more values, and also possibly one or more functions to control access to those values. The Instrument's values will represent the Tools internal variables, and the tool will be designed to interact with those values. The instruments by name and their purpose are: a "State Instrument" to record and make readable to outside threads, the internal states of a Tool during and after processing; a "Configuration Instrument" which can predefine a Tool's behavior before runtime; and an optional "Control Instrument" which may be used to control a tool during runtime in the case where the State Instrument will be used only for monitoring. The given instrument names are suggested for example only, and in real systems may be renamed provided the name's descriptiveness is consistent with the suggested names' functionality.

The programmer instructs a Tool (function) to begin operation by passing the instruments and any operand objects into the Tool, via the Tool's argument list, at call time. The Tool may be designed to execute in a separate thread from its calling thread, though this is not required.

In the preferred embodiment, groups of functionally-related Tools will each accept the input Instruments and any operands in a same or similar order in its argument list, though this is not strictly required and will vary by the Tool's use-case.

Because of their typically transient life cycle and close relation in a threaded context, a control and State Instrument can alternatively be contained inside of one and the same object; this consolidated State and Control Instrument is the preferred embodiment of the invention. In this case only a Configuration and State Instrument will be supplied to a Tool.

The programmer may choose to either create or else reuse existing instruments, depending on whether an instrument will be concurrently used by multiple threads or contain read-only vs writable data, and whether a state recording Instrument should record summed values from repeated uses of tools.

DETAILED DESCRIPTION OF THE INVENTION

Tool Detail

The Tool in its literal form is a software function (also known as a "method" or "procedure"). The function should have a name which logically describes its functional type (purpose), or, should otherwise have a name which logically identifies its input or return object type. In the preferred embodiment, Tools with similar functional type or object type capabilities will be placed into a named class, or named object-reference, who's name is the converse of the function or type description given to it's contained Tools' names. The use of a class or object reference serves to represent a Toolbox, and contain Tools that are organized by their purpose.

When object references contain the Tools, they may be automatically generated inside of some working context. When classes are used, such as in a class modeling environment, the class may be static, or otherwise its individual methods be static (constructed by the machine before use).

For example collections of file processing Tools may be contained in a static class with the name 'Files' or 'FileUtils', therein describing the class's function's object type support, and Tools (functions) inside the class may be named 'copy' and 'mode' to indicate their functional type. Likewise, the same Tools 'move' and 'copy' may be contained inside of an implicitly generated object reference within a JSP (JavaServer Page) script, having the name 'files' or 'fileUtils', wherein the JSP server generates the object reference inside of each service( )method.

In a different example, collections of data copying Tools may be contained in a static class with the name 'Copy' or 'CopyUtils', therein describing the class's function's functional type support, and Tools (functions) inside the class may be named 'file' and 'stream' and 'arrays' to indicate their object type. Likewise, the same Tools named 'file' and 'stream' and 'arrays' may be contained inside of an implicitly generated object reference within a JSP (Java server page) script, having a the name 'copy' or 'copyUtils', wherein the JSP server generates the object reference inside of each service( )method.

The choice by the Tool designer to group Tools by functional, or object type, will depend on which model of a real-world Toolbox is most convenient for an anticipated use case, including logical organization, frequency of use, Tool count, and memory restrictions.

Because some programming environments do not support compound objects and class modeling, Tools (functions) in those environments may need to exist anonymously, that is, they cannot not be contained in a class or object reference or package provided, namespace; In these cases their function name alone should indicate both, their functional, and object type capability. In this case the functions (Tools) must exist anonymously, that is, not be contained in a class or object reference or package, and their names alone must adequately describe their purpose.

The Tools (functions) will accept multiple direct inputs (arguments) which are: the Configuration Instrument; the State Instrument; an optional Control Instrument; and zero or more operand objects which contain data or otherwise represent abstract data (files, URLs) for processing.

Instrument Overview

Instruments in their literal form are references to compound objects, which may be Class objects as in Java, Structs as in C, or generic arrays, for example. Therein, each instrument supports containing plural values or other object references. In the preferred embodiment, an Instrument will also provide functions to control access to, or perform actions to, its contained values, such as in Class object environments. As in real world instruments, each value or reference contained in the Configuration, Control, and State instruments is used to store values in time (before, during and after execution of a Tool) and space (handling of an instrument between it's creator and reader, and the internals operations of the Tool).

Instruments are designed in conjunction with Tools, so that a Tool will know how to interpret (as in a Configuration instrument) or modify (as in a State instrument) the values contained in the Instruments.

Instruments are created as necessary by the application programmer, then passed into a Tool at call time. For example, to use a file copy Tool, the programmer may choose to monitor its status during the file copy process, by first instantiating a new 'Files.State' instrument, passing it to the 'copy' Tool at call time, then monitoring its internal values, such as a 'bytesCoped' value to count number of bytes copied. When summary values are desired, a State instrument may be reused for each use of the 'copy' Tool, allowing total sums to be recorded.

Instruments may designed to implement (behave as) one or more parent interfaces (characteristics); this allows designing instruments that can be used by multiple, unrelated Tools. In such a design each Tool may be designed to interact with only those values or interface methods in instruments which pertain to the Tool's function (as specified by the Tool's declared interface type acceptance for each input instrument). For example, a configuration instrument named 'SecureDiskConfig' could implement a 'limitBytesSec' functionality which is described in a 'FilesConfig' interface, and also implement a 'limitOwnership' functionality which is described in a 'Security' interface. Thus, this SecureDiskConfig may be used by Tools in a 'Files' Toolbox (Tools which only need to understand and act upon its 'limitBytesSec' value), and also may be used by Tools in a 'Security' Toolbox (Tools which only need to understand and act upon its 'limitOwnership' value to limit who's files can be modified). In another example, most 'stream' Tools can be identified as needing an ability to abort processing of the streams (operands) before the stream has been fully read, such as when a user clicks a 'cancel' button. This abstract functionality can be defined in an interface or abstract class that is understood by a generic stream processing Tool as being a Control instrument, and could therefore be used to control any other Tool which has been designed to handle stream processing and the aforementioned Control instrument; for example network, file, and multimedia processing Tools.

Instruments may designed to extend parent classes, this allows for simplified Instrument design by using the capabilities already contained in their super class. For example, a Streams.State class which contains a 'bytesCopied' value to record the number of bytes copied (an operation desirable in any stream based operation), could be extended by a Files.State class which add values to record the number of files copied and total number of bytes copied for all those files. Because a Files.State class can extend a Streams State class (Files can be processed as streams), any software component which understands how to read values from a Streams.State (such as a graphical-user-interface Progress Bar) will be able to monitor the number of bytes processed by the file copy Tool, and also be used monitor the number of bytes processed by different descendant of Streams.State, such as a Networks.State instrument that is used to record number of bytes processed for a Network operation.

Instruments may be designed to store callback functions, to notify other threads when some internal state event has occurred during operation of the tool. For example, a file copy Tool which has received a State Instrument was assigned 'copyComplete' function, could be programmed to call the function correspondingly. Instruments may also be designed to store user generated function which may perform customized operations. For example, a file copy tool which has received a State Instrument with a 'customCopy' function (which conforms to and implements a known function Interface/contract), could execute that function instead of the tool's own function; this could allow the programmer to write functions which, for example, apply custom filters to the byte stream during copy operations.

Tool Variations

In the preferred embodiment, Tools will accept each argument passed to their input (argument list) directly. In an alternative embodiment, a Tool may be designed to accept one or more instruments which themselves will contain other instruments, which are not passed directly into the Tool's argument list. For example, a Configuration Instrument and Control Instrument may be store-able in the State Instrument, and only the State Instrument would need to be passed into the Tool, which will have been designed to obtain the Configuration and Control instruments by using accessor methods contained in the State Instrument. Other encapsulation models are also possible; however each instrument must be treated as distinct by a Tool and instruments' software API, and each is made available to the programmer; as this is essential to the spirit and scope of the invention.

In the preferred embodiment, a Control Instrument's member values and functions and a State Instrument's member values and functions may instead be consolidated into a single instrument named 'State', for example, because both the original Control and State Instruments would typically be used only by one Tool (thread) at a time, and both these instruments typically have a short lifespan, where as a Configuration instrument may be re-used for the duration of the program's operation. In this design a Tool's argument list would only accept a Configuration and State Instrument, without the third Control instrument.

A Tool may be internally designed to create (normalize) a 'default' instrument if a null or a otherwise invalid one is given to the Tool. This design decision depends on the Tool's specific use-case, because in some cases normalization may not be appropriate or safe. In the case where a Tool should perform normalization of its input instruments, the instruments' values can be generated from defaults which are stored in databases or configuration files, for example.

In addition to Instruments inputs supplied to a Tool's argument list, the Tool will also accept zero or more operand objects that will be used for processing. Operands are one or more subject (values or object references) to be acted upon or used in conjunction to effect a result on the value that a Tool will create or modify. For example, a 'copy' function contained in a 'Files' Toolbox may accept two operands which are paths to a source and a destination file path. Such a 'copy' Tool would also accept a Configuration instrument which might contain, for example, values to regulate the number of bytes copied per second, and define the file-overwriting behavior.

In the case where no operand (inputs) are provided, a Tool will create new objects (such as in the factory design pattern), or may otherwise treat the values stored in one or more of its input instruments as the operands to be acted upon; for example if a State Instrument was itself designed to store and convey the operands to a Tool for processing, such as in the case where a file copy tool reads source and destination file paths which were stored in a State instrument passed to the file copy Tool. When one or more operands are supplied to a Tool (function), it may modify (mutate) one or more of the operand's internal value(s), or instead return a new value that is influenced by the values in the original operand (such as in the case where the original object is immutable or otherwise should not be modified).

Additionally, input-overloaded Tools (functions) may be provided which, for convenience, do not require all of the instruments; for example, a network download function may be desired in which the programmer need not monitor the status of the download. In this case a Tool may internally generate these from some default values, such as in the case where the Tool internally makes use of its State Instrument to record its progress. It is not required that all the Tools in a Toolbox must accept all of the instruments, in the case when function overloading is used.

All related Tools for a particular functionality, should use a consistent input design for allowing the programmer to supply Configuration, Control, State, and any operands to Tools; For example the first argument to each Tool may be a State Instrument, second a Configuration Instrument, third Control, followed by any operand objects. The programmer using the Toolbox can then anticipate this order while writing software, irregardless of whether a Tool will be used for example, for network operation control or monitoring, or thread control or monitoring.

A Tool may return its newly created or modified objects via the function's return mechanism, or, a Tool may have a void return type and instead store the new or modified objects inside of a State Instrument or Control Instrument, thereby making them available to the calling thread before and after execution. The latter method allows the calling thread to obtain access to the newly created or modified value while it is being created or modified; this is useful in cases where the value requires a substantial amount of time to operate on, but the value maybe also usable before the operation has completed, such as in the example of calculation of large prime numbers.

Configuration Instrument Detail

A Configuration Instrument is created by the programmer, possibly with customized initial values, or otherwise using the Instrument's default values, then passed into a Tool's argument (input) list. The Configuration Instrument contains one or more values which will affect how a Tool will behave, and are read by the Tool before execution. In the preferred embodiment, the values in a Configuration Instrument will not frequently be changed by a Tool or any external threads, though this is not a strict requirement. This preferred infrequent-mutation characteristic makes the Configuration Instrument suitable for repeated and simultaneous use by one or more Tools and threads. This is in contrast to Operands, and Control and State Instruments, which contain values which will normally change with each invocation of a Tool and on a per-thread basis.

The Tool may be designed to behave based on combinations of values contained in its supplied State and Configuration instruments. In one example, a Configuration Instrument contains a value which a Tool is programmed to compare to a value in a State Instrument, and therein may cause the Tool to change or otherwise abort its behavior; for example when the State Instrument indicates that 1000 bytes of data have been processed, the Tool may observe a 1000 bytes per second 'limit' configuration, then begin processing some other operand which was passed into the Tool. In another example, a Control Instrument may contain a numeric value which a Tool has been programmed to use for regulating the number of bytes processed per second; in this design an external thread or process may change this bytes processed per second values while the process is executing, and the Tool may adjust to this new value by checking it at some interval (such as inside of a processing loop). This design also allows for uniform configuration changes to simultaneously effect multiple threads, such as in the case where a Control Instrument is concurrently used by multiple Tools.

A new Configuration Instrument may be constructed for each invocation of a Tool, or an existing one reused.

A Tool may be designed to permit some of the Configuration instrument values to be presented as arguments directly to the Tool, instead of being contained solely inside of the Configuration Instrument; this permits some Tools to more conveniently be configured, especially if a configuration value will change with each invocation of the Tool. In this case the design may be preferable if the configuration value does not have a clear functional distinction from that of an operand value. In the preferred embodiment, the Tool designer will carefully anticipate conditions which a programmer is more likely to regard as Configuration Instruments, as opposed to operands (factors). For example, a Tool which retrieves and returns a byte array or stream from a network server would usually have at least two operands; one is the URL of the resource, and the second is the authentication information used to access that network server. The Configuration Instrument would typically contain non-changing values such as network connect timeout, buffer sizes, and standard TCP/IP configuration values—but not the user credentials or URL. In another example, a Tool may be designed to accept a Configuration Instrument which does store credential information, for example where the user credentials do not need to change between tool-invocations, such as when an already logged-in user is repeatedly using the Tool.

A Tool may be designed to periodically check for changed values in a Configuration Instrument and then change its behavior based on those values, although the preferred embodiment any periodic polling for changes will be of values contained in a State Instrument or Control Instrument.

A Tool will itself not normally make any changes to a Configuration Instrument, though in certain circumstances this may be preferred, an example being the case where a Configuration Instrument contains an illegal value and the Tool has been designed to automatically normalize the value to an acceptable range.

In addition to values stored in a Configuration Instrument, a Configuration Instrument may also be designed to store callback objects and functions. Such callback objects may be called by a Tool during processing, to allow for change notification to external threads. However the preferred embodiment should have any callbacks contained in a State Instrument, as callback events most often represent status reporting functionality which occurs on a per thread basis.

Control Instrument Detail

A Control Instrument is created by the programmer, possibly with customized initial values, or otherwise using the Instrument's default values, then passed into a Tool's argument (input) list. A Control Instrument contains one or more values which will affect how a Tool behaves during, and (at the tool designer's discretion) possibly before, execution. The values in a Control Instrument may be changed by external threads to affect operation of the tool. For example, a Tool which retrieves and returns a large byte array or byte stream from a network server would typically have a control to abort the operation before normal completion. In another example, a network download Tool may be designed to accept a Control Instrument that contains login credential information, in the case where the user credentials are anticipated to change between invocations, such as when files are being retrieved from multiple servers which each require different login credentials. Again in this example the Control Instrument would typically contain frequently-changing network control values.

A Tool will be internally designed to understand and behave based upon one or more control value(s) in a Control Instrument. For example, a Control Instrument may contain a value 'abort' which instructs a Tool to stop processing when set to 'true' (directly or by an accessor method). An external thread or process may change this while the process is executing, and the Tool may observe this new value by checking it at some interval (such as inside of a processing loop). Another example is one where a Control Instrument contains a value which when compared by a Tool to a value in a State Instrument, signifies that the Tool should change or otherwise abort its behavior, for example when the State Instrument indicates that 1000 bytes of data have been processed, the Tool will observe a 1000 byte 'limit' control, then may begin the same processing on some other operand passed into the Tool.

A new Control Instrument may be constructed for each invocation of a Tool, or an existing one reused.

A Tool will be designed to periodically check for changed values in a Control Instrument and thus the Tool may dynamically change its behavior based on those values. A Tool will itself normally not make any changes to a Control Instrument, though in certain circumstances this may be preferred, an example being the case where a Control Instrument contains an illegal value and a Tool has been designed to automatically normalize the value to an acceptable range.

In addition to values contained in a Control Instrument, the Control Instrument may also be designed to store callback objects and functions, which are supplied to a Tool via its argument list. Such callback objects may be called by the Tool during processing, to allow for change notification to external threads. For example, a 'copy' Tool in a 'Files' Toolbox may be designed to call any 'copyComplete' functions, which have been stored in a Control Instrument, after completing a file copy operation.

State Instrument Detail

A State Instrument created by the programmer, possibly with customized initial values, or otherwise using the Instrument's default values, is passed into a Tool's argument (input) list. A State Instrument contains one or more values which will record various internal states of the Tool's operation, and are readable to external threads during operation, or the calling thread after execution. The Tool will update those values at some interval which is wholly determined by the particular Tool's design.

For example, a State Instrument may contain a value 'running' which a Tool will update to indicate whether the process is 'running' or has 'completed' processing data, or is in a thread 'wait' state. In another example, a State Instrument may contain a numeric value 'bytesCoped' which a Tool has been designed to use for recording the of number of bytes currently processed in a stream. The values in both examples may be read by another thread which has access to the State Instrument's reference. For example, in a file copy application, an application programmer would first create and store a reference to a new Files.State Instrument (or re-use an existing one), pass the Files.State Instrument into a 'copy' Tool in a 'Files' Toolbox, then monitor the values contained in the Files.State Instrument from within another thread, such as to show what percentage of the file has been copied, from a progress bar.

Additionally, as described in claim 1, which is the preferred embodiment, a State instrument may also contain values which may be modified by external threads and will be monitored by a Tool; thus these values may be used to affect how a Tool behaves before and during execution.

For example, in a file copy application, an application programmer would first create and store a reference to a new Files.State Instrument (or re-use an existing one), pass the Files.State Instrument into a 'copy' Tool in a 'Files' Toolbox, then another thread may change an 'abort' value contained in the Files.State Instrument from 'false' to 'true', such as to accept user input of clicking on a Cancel button.

Unlike a Control Instrument which should normally not be modified by a Tool, a Tool may be designed to frequently update one or more values contained in a State Instrument.

The application programmer may re-use an existing State Instrument for each Tool invocations, or otherwise create a new State Instrument for each Tool invocation. For cases where a State Instrument is reused, it may be designed so that the application programmer may be able to reset one or more of its already modified values as needed. For example, in a file copy Tool that copies many files, the application programmer may use a single State instrument to cumulatively record to the number of bytes copied during one or more successive Tool executions.

In addition to values contained in a State Instrument, a State Instrument may also be designed to store callback objects and their functions, which are supplied to a Tool via its argument list. The Tool may be designed to call such callback functions before, during, or after completion, therein allowing for more efficient state change notification (detection) by other objects and threads that wish to be notified of status changes; this is more efficient because monitoring threads do not need to periodically poll the State instrument's status values. For example, in a file copy Tool, the application programmer may choose to use an event listener named 'CopyComplete' to be notified when a copy operations is complete, and so would store the CopyComplete listener in a Files.State instrument before passing that instrument to a Tool; the Tool will have been designed to call the 'complete' function contained inside any CopyComplete objects that were stored in the Files.State instrument, after completing each file copy.

Aggregated Instruments

As recited in claim 1, it is anticipated that some Tool designs will allow for the functionality of the Control and State Instruments to be integrated into a single instrument, which may be named, for example, Status, or State. This allows for a hybrid type of State Instrument which contains status and control values that are expected to frequently change during runtime, whereas a Configuration Instrument will contain values which will change infrequently. An example relating to a file copying Tool, is to place an abort( ) function in a State Instrument, and a Configuration Instrument can contain values which would only be used to configure a Tool before processing, such as buffer size and file-name patterns. In another example, controls to abort stream processing can be placed in a State Instrument, thereby obviating the need for a separate Control Instrument, and while still preserving the preferred infrequent-modification characteristic of the Configuration Instrument.

Similarly, and as recited in claim 2, it is anticipated that some Tool designs may allow for the functionality of the Control and Configuration Instruments to be wholly integrated into a single Configuration Instrument instrument, which may be named Control, or Configuration for example. This allows for a new type of Control Instrument which is only modifiable by the Tool itself, and who's values can only be read (not modifiable) by external threads. Unlike in claim 3, the new, combined Configuration and Control Instrument will contain both, values which will not be expected to change frequently, and also Control values which may be frequently changed to alter the behavior of a Tool during runtime. For this reason if the combined Control and Configuration Instrument is to be re-used, some control values will require resetting prior to re-use. For example, a control value that indicates that a stream processes Tool should abort before normal completion, will require that a 'abort' value must be reset to 'false' before each use.

Encapsulated Control, Configuration, and State Instruments

In addition to supporting direct passing of Configuration, Control and State Instruments to a Tool, it is recognized that one or more of the instruments may be encapsulated inside of another object, for example a 'InstrumentHolder' class, or encapsulated inside of an existing single instrument. In either case they are indirectly passed into a Tool for processing by virtue of their encapsulation inside of an object which is supplied to the Tool. This offers an advantage of a Tool design which requires fewer arguments on its input, simplifying it's use. Therefore the scope of the invention anticipates this encapsulation technique of providing instruments to a Tool.

Multiple Configuration, Control and State Instruments

It is recognized that some Tools will benefit from a Tool design which will accept more than one of the same instrument as an input. An example benefit of this design is that a Tool may be designed to choose alternative control values in the event of processing errors or other conditions, such as in an example where when a certain number of bytes have been copied by a stream Tool during a one hour period, an alternative control object can be used which reduces the maximum instantaneous pressing bit rate.

Similarly, multiple State Instruments may be needed in cases where a Tool is acting upon an object where more than one process or process chain may desire to track actions performed upon a single object of interest, for example, when two separate processes which share ownership of a file, and each may desire to account for that file's read or write actions by the other process; in this example each process would provide it's own State Instrument to the Tool, and the Tool will update each State Instrument to indicate when a write action is occurring on the file.

Instruments by Different Names

It is recognized that Control and State Instruments can have different names from described here, however name variations which still generally refer to the aforementioned instrument purposes, should be considered within the scope of the invention. For example, a Control Instrument in one implementation may instead be named "Actions". Similarly, a State Instrument could instead be named "Status".

Statically Constructed Tool Classes Vs Context Generated Ones.

Many programming languages provide a programming construct known as 'static', which refers to functions or classes which are pre-constructed by the runtime so that the programmer does not need to instantiate them prior to using their contained functions. Others require the programmer to explicitly construct objects, who's object references (or pointer) can then be assigned to a named variable (also known as a reference or pointer), thereby providing access to the functions within that object. Lastly, some software APIs automatically perform the object construction, and implicitly create a named variable for that object inside of another context; for example, Java Server Pages implicitly create a 'pageContext' in each JSP page; the spirit and scope of the invention should apply to Tools instantiated using any combination of these three strategies.

Benefit of Shared Process Control and Monitoring, and N Depth Process Control and Monitoring.

By nature, the invention allows one thread (or process) to singularly control or monitor entire groups of other concurrently executing Tools (each running in a separate thread), by sharing a single Configuration or State or Control instrument between concurrent Tool operations. For example in a multi threaded computer program, one or more files may be concurrently uploaded to a single network server, and the program may desire to limit the total bit rate sent to that server. By constructing a single Control Instrument, which the programmer has allocated to logically represent that single server, then supplying that Instrument to each Tool (thread), the program's controlling thread (such as a user interface) can modify the total byte sending rate (for example when another upload thread for the same server starts or stops), by changing the Control's 'limitBytesSec' value (which the Tool is designed to obey) in response to changes in a shared (also being used by each thread) State instrument's 'bytesCopied' when re-measured at some time interval. Likewise, a single State Instrument can be updated by multiple concurrent threads; allowing some other thread to monitor the total number of processes and their processing states.

The shared instrument design also naturally allows for control or monitoring of Tools with recursive operations; for example a Tool which is designed to copy directory trees may require a recursive call of the same Tool based on processing for each subdirectory. If a Tool is designed to pass its supplied Control Instrument to recursive calls of itself, the processing can be controlled and monitored at any recursion depth.

One or more Tools may be designed to automatically execute the Tool's operation inside of a thread that is automatically provided by the Tool. This allows the Tool-caller to not wait for a return blocking behavior, that is typical in traditional function based programming environments. For example, a file copy Tool, upon being called, could start the copy operation inside of another thread that it creates or borrows from a thread pool; upon dispatching the operation to another thread, the Tool quickly returns without blocking the calling thread. If the Tool caller has stored access to the State Instrument that it provided to the Tool, it can monitor for completion of the copy operation by polling the State Instrument's 'copyComplete' variable, or otherwise be notified of its completion via a callback object that may be stored in the State instrument.

Additionally, a Tool may be designed to support both blocking and non-blocking behavior, defined prior to Tool operation by a value stored in one of the Instruments. For example a Control Instrument which contains a 'doFork' boolean value that is set to 'true', would indicate to the Tool that it should perform it's operation inside of another thread, then quickly return (possibly with a void or some other some value such as thread reference, for example). The Tool-calling thread will then be able to monitor for task completion by polling a value in a State Instrument that it supplied to the Tool, or by receiving notification through a callback object which it stored inside a State Instrument supplied to the Tool, for example.

Atomic Tools and Instruments

Some operations which appear to be nearly instantaneous in operation, such as string manipulation Tools, may benefit from also accepting the same instruments that a time consuming tool accepts. For example, a 'replace' Tool in a 'Strings' toolbox in infrequent cases my be called to replace all occurrences of one substring with another string, inside of the input string (stored in memory or not); if the input string is very large—say several hundred megabytes—the process may in actuality take several seconds, and so in some cases will benefit from the use of a State monitoring Instrument to monitor the replace-progress, and well as a Configuration Instrument which may for example be used to change the thread's priority just during the replace operation's duration. The uniform use of the Instrument based Tools even in normally fast-operation Tools is not a required characteristic of a Tool set, though is preferred because it reinforces a uniform Tool design from the Tool user's standpoint, wherein all Tools should ideally accept Instruments at call time.

Where the term 'value' has been used above, it should be recognized that the related programming terms 'object reference' and 'object pointer' (notions of indirect references to values) can be used interchangeably. Similarly, the terms 'function' and 'method' and 'procedure' may be used interchangeably.

Many changes and modifications in the above described example embodiments of the invention can be utilized, without departing from the spirit or scope of the present invention. The detailed description and examples, therefore, should not to be taken in a limiting sense, and the scope of the present invention is defined only by the appended claims.

The inventions claimed are:

1. A system that facilitates development and operation of software running on a computer, comprising:

multiple static classes or class references, stored in a computer readable storage media and executed on a processor, that each represent a virtual Toolbox, and said classes having a name which describes said Toolbox's predominant object type or process type compatibility; and;

said classes contain one or more functions representing Tools, said Tools having the ability to create new objects or to modify objects which are input to said Tool, and each of said Tools have names which correspondingly describe said Tool's specific object type or process type compatibility, wherein the improvement is that said functions must also accept as inputs;

a) one or more Configuration Instruments (configuration class) which contains values that the Tool has been designed to understand for the purpose of defining the behavior of said Tool before execution; and b) one or more State Instruments (state class) which contains values that the Tool has been designed to modify during execution, said values will be used to store one or more of the Tool's internal states (values), and the State Instrument will make said values readable by one or more external threads or processes, during and after execution of the Tool; and said State Instrument may additionally contain values that the Tool has been designed to understand for the purpose of controlling the behavior of said Tool before and during execution;

c) one or more operand objects to be retrieved or modified or used to affect the creation of new objects by said Tool, or zero or more operands when a tool is designed to create an object.

2. A system as recited in claim 1, where one or more of the instruments are encapsulated inside of a single object which is supplied to an input list of said Tool.

3. A system as recited in claim 1, wherein the toolbox additionally provides argument-overloading functions wherein said argument-overloading-functions do not require all of the function's instruments, and wherein said argument-overloading functions will be internally designed to, create or reuse default instruments of the omitted type.

4. A system as recited in claim 1, wherein one or more instruments contain one or more callback functions that may be used to notify another thread of a change in said instruments' values.

5. A system as recited in claim 1, wherein said Tools internally are designed to execute the Tool operation inside of a separate thread that the Tool automatically provides, and said Tool thereby provides non-blocking return behavior and thread management code that would otherwise be implemented by the Tool's caller.

6. A system as recited in claim 1, wherein said Instruments may additionally convey one or more user-provided procedure codes (functions) which the Tool may use for controlling its operations, and the Tool is designed to execute said procedures.

7. A system that facilitates development and operation of software running on a computer, comprising:

multiple static classes or class references, stored in a computer readable storage media and executed on a processor, that each represent a virtual Toolbox, and said classes having a name which describes said Toolbox's predominant object type or process type compatibility; and;

said classes contain one or more functions representing Tools, said Tools having the ability to create new objects or to modify objects which are input to said Tool, and each of said Tools have names which correspondingly describe said Tool's specific object type or process type compatibility, wherein the improvement is that said functions must also accept as inputs;

a) a Control Instrument (control class) which contains values that the Tool has been designed to understand for the purpose of defining the behavior of said Tool before and during execution; and b) one or more State Instruments (state class) which contains values that the Tool has been designed to modify during execution, said values will be used to store one or more of the Tool's internal states (values), and the State Instrument will make said values readable by one or more external threads or processes, during and after execution of the Tool; and c) one or more operand objects to be retrieved or modified or used to affect the creation of new objects by said Tool, or zero or more operands when a tool is designed to create a object.

8. A system as recited in claim 1, where one or more of the instruments are encapsulated inside of a single object which is supplied to an input list of said Tool.

9. A system as recited in claim 7, wherein the toolbox additionally provides argument-overloading functions, wherein said argument-overloading functions do not require all of the function's instruments, and wherein said argument-overloading functions will be internally designed to, create or reuse default instruments of the omitted type.

10. A system as recited in claim 7, wherein one or more instruments contain one or more callback functions that may be used to notify another thread of a change in said instruments' values.

11. A system as recited in claim 7, wherein said Tools internally are designed to execute the Tool operation inside of a separate thread that the Tool automatically provides, and said Tool thereby provides non-blocking return behavior and thread management code that would otherwise be implemented by the Tool's caller.

12. A system as recited in claim 7, wherein said Instruments may additionally convey one or more user-provided procedure codes (functions) which the Tool may use for controlling its operations, and the Tool is designed to execute said procedures.

13. A system that facilitates development and operation of software running on a computer, comprising:

multiple static classes or class references, stored in a computer readable storage media and executed on a processor, that each represent a virtual Toolbox, and said classes having a name which describes said Toolbox's predominant object type or process type compatibility; and;

said classes contain one or more functions representing Tools, said Tools having the ability to create new objects or to modify objects which are input to said Tool, and each of said Tools have names which correspondingly describe said Tool's specific object type or process type compatibility, wherein the improvement is that said functions must also accept as inputs;

a) a Control Instrument (control class) which contains values that the Tool has been designed to understand for the purpose of defining the behavior of said Tool during execution; and b) one or more Configuration Instruments (configuration class) which contains values that the Tool has been designed to understand for the purpose of controlling the behavior of said Tool before execution; and c) one or more State Instruments (state class) which contains values that the Tool has been designed to modify during execution, said values will be used to store one or more of the Tool's internal states (values), and the State Instrument will make said values readable by one or more external threads or processes, during and after execution of the Tool; and d) one or more operand objects to be retrieved or modified or used to affect the creation of new objects by said Tool, or zero or more operands when a tool is designed to create a object.

14. A system as recited in claim 13, wherein the functionality of the Control and State Instruments are consolidated into a single instrument that will be used to control and monitor the tool during operation.

15. A system as recited in claim 13, wherein the functionality of the Control and Configuration Instruments are consolidated into a single instrument that will be used to control the tool before and during operation.

16. A system as recited in claim 13, where one or more of the instruments are encapsulated inside of a single object which is supplied to an input list of said Tool.

17. A system as recited in claim 1, wherein the toolbox additionally provides argument-overloading functions, wherein said argument-overloading functions do not require all of the function's instruments, and wherein said argument-overloading functions will be internally designed to, create or reuse default instruments of the omitted type.

18. A system as recited in claim 13, wherein one or more instruments contain one or more callback functions that may be used to notify another thread of a change in said instruments' values.

19. A system as recited in claim 13, wherein said Tools internally are designed to execute the Tool operation inside of a separate thread that the Tool automatically provides, and said Tool thereby provides non-blocking return behavior and thread management code that would otherwise be implemented by the Tool's caller.

20. A system as recited in claim 13, wherein said Instruments may additionally convey one or more user-provided procedure codes (functions) which the Tool may use for controlling its operations, and the Tool is designed to execute said procedures.

* * * * *